United States Patent [19]
Johansson et al.

[11] Patent Number: 5,857,783
[45] Date of Patent: Jan. 12, 1999

[54] METHOD AND DEVICE FOR AXIALLY FIXING A RING MEMBER TO A SHAFT

[75] Inventors: Per Olof Johansson, Jörlanda; Nils Manne, Göteborg, both of Sweden

[73] Assignee: Aktiebolaget SKF, Göteborg, Sweden

[21] Appl. No.: 818,650

[22] Filed: Mar. 19, 1997

[30] Foreign Application Priority Data

Mar. 19, 1996 [SE] Sweden ................................ 9601031

[51] Int. Cl.$^6$ .................................................... F16C 19/26
[52] U.S. Cl. ........................... 384/556; 384/537; 384/585
[58] Field of Search ................................... 384/556, 559, 384/510, 585, 537

[56] References Cited

U.S. PATENT DOCUMENTS

| 1,772,008 | 8/1930 | Kasper . | |
|---|---|---|---|
| 3,304,139 | 2/1967 | Toth et al. | 384/556 |
| 3,558,199 | 1/1971 | Raiser et al. | 384/556 |
| 3,799,636 | 3/1974 | Kersting et al. | 384/556 |

FOREIGN PATENT DOCUMENTS 191631   7/1937   Switzerland .

*Primary Examiner*—Lenard A. Footland
*Attorney, Agent, or Firm*—Burns, Doane, Swecker & Mathis, L.L.P.

[57] ABSTRACT

A method for joining a ring member, e.g. a bearing inner race ring, to a shaft so that the ring member is primarily prevented from axial motion relative to the shaft involves arranging the ring member over the shaft so that the shaft extends through a bore in the ring member, and applying between the ring member and the shaft a clamping wedge force in which a tapering locking surface acts against a substantially corresponding tapering surface. The device for joining the ring member to the shaft includes a locking member mounted on the ring member and provided with a tapering contact surface that faces towards the shaft. An arrangement is provided for pressing the locking element against a tapering counter surface that is fixed in position relative to the shaft to prevent axial movement of the ring member on the shaft.

14 Claims, 4 Drawing Sheets

FIG:1
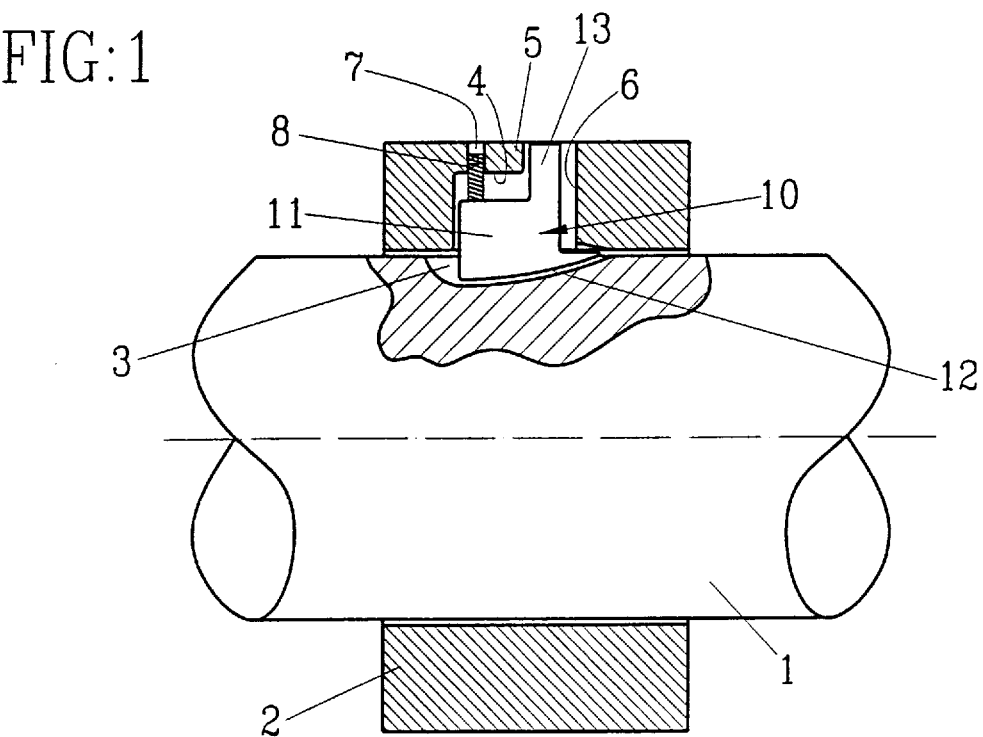
FIG:2
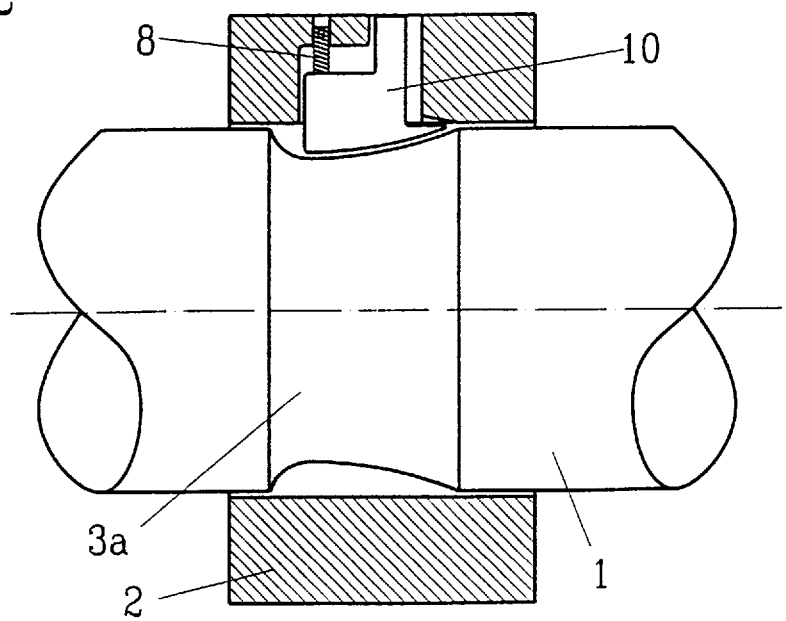

FIG:3
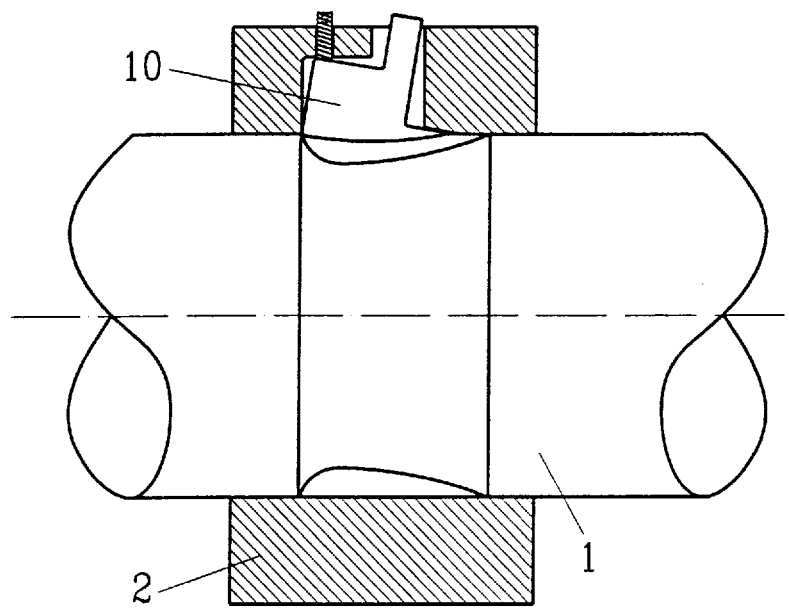
FIG:4
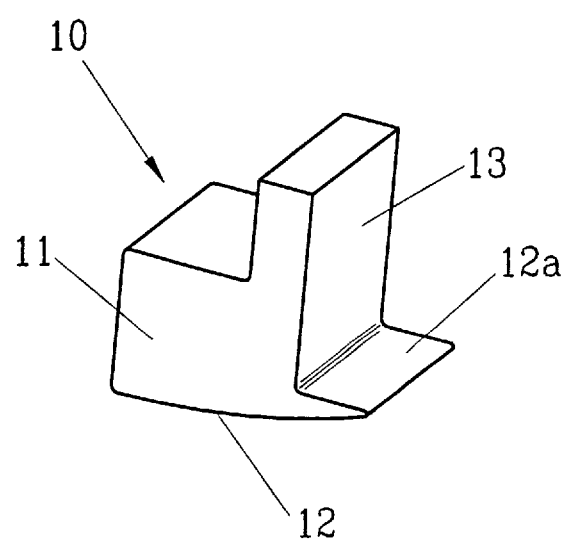

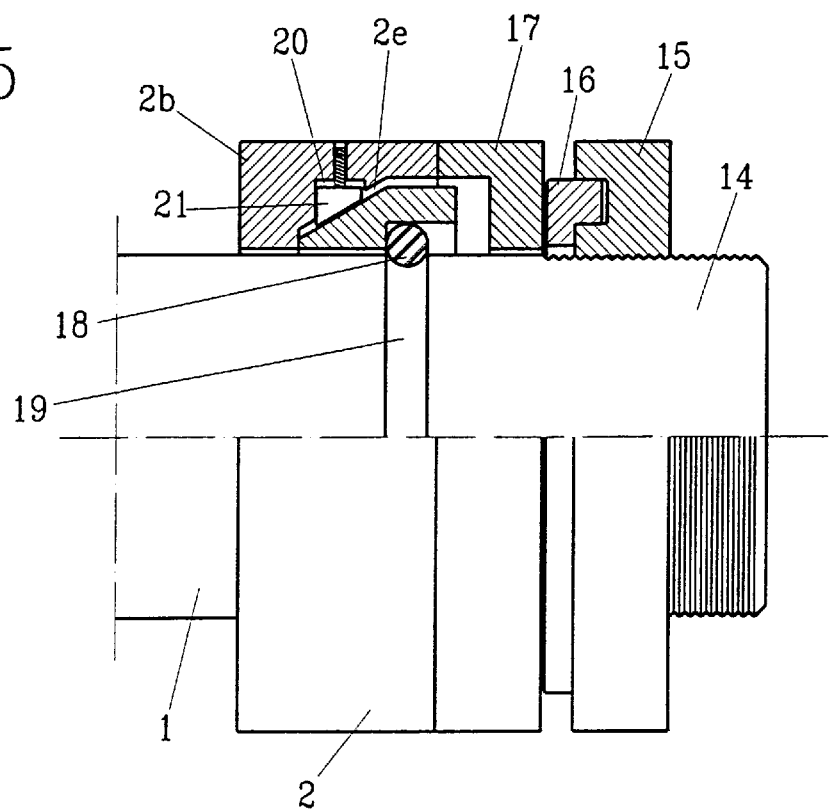
FIG:5
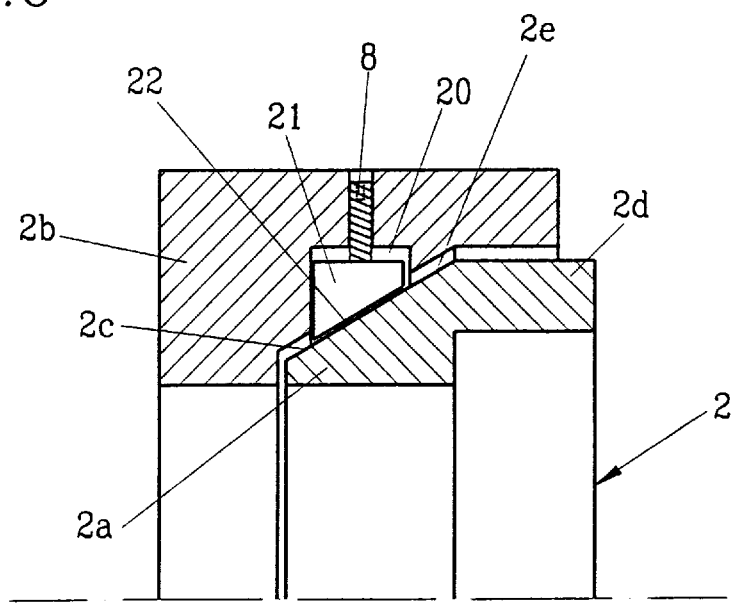
FIG:6

METHOD AND DEVICE FOR AXIALLY FIXING A RING MEMBER TO A SHAFT

FIELD OF THE INVENTION

The present invention relates to a method and a device for axially fixing a ring member to a shaft. More particularly, the present invention involves a method and device for axially fixing a bearing inner race ring to a shaft.

BACKGROUND OF THE INVENTION

Various methods and devices for locating and fitting a ring, a hub or the like to a shaft are known. A particularly difficult problem in this regard is to secure a ring member which is to be pretensioned to a certain axial preload. This is required, for example, in connection with taper roller bearings, although the method is not limited to the fitting of rings, and the problem then is momentarily to lock the ring axially and radially, at the moment the ring has obtained exactly the required or desired preload, without the ring thereby or thereafter being able to creep axially on the shaft. The securing methods commonly used do not generally permit this possibility as the preload usually must be applied with the use of shims, spacer sleeves, deformable sleeves, etc. In this way, there is no guarantee that the exactly applied preload will not be altered due to unknown degrees of deformation or infinite movements between the shaft and ring before the ring is secured, e.g. with a locking nut, which furthermore requires that the shaft is provided with a threaded portion.

SUMMARY OF THE INVENTION

A need exists, therefore, for a method which presents the possibility of positively securing the ring member to the shaft in a simple way.

A need also exists for a way of making this securing possible in a relatively simple manner without the necessity of providing the shaft with a thread while also providing a connection that is highly reliable.

It would also be desirable to provide a way of giving a ring a preload on a shaft and thereupon instantly fixing the ring in its preloaded position, while at the same time not permitting slipping movement between the shaft and the ring.

According to one aspect of the invention, a method for joining a ring member to a shaft to prevent at least axial movement of the ring member relative to the shaft involves arranging a ring member on a shaft so that the shaft extends through a bore in the ring member, and applying a clamping wedge force between the ring member and the shaft to prevent at least axial movement of the ring member relative to the shaft. The clamping wedge force is substantially instantaneously appliable and acts with a tapering locking surface against a substantially corresponding tapering surface to prevent axial movement of the ring member relative to the shaft.

According to another aspect of the invention, a method for applying and maintaining a preload on a ring member that is fitted on a shaft includes arranging a ring member on a shaft so that the shaft extends through a bore in the ring member, applying an axially acting force to the ring member to preload the ring member, and applying a clamping wedge force between the ring member and the shaft that acts with a tapering locking surface against a substantially corresponding tapering surface to prevent axial movement of the ring member relative to the shaft.

Another aspect of the invention involves a device which fits a ring member provided with a bore to a shaft with the shaft extending through the bore of the ring member. The device includes at least one locking member mounted on the ring member and provided with a tapering contact surface that faces towards the shaft, and a tightening mechanism operatively associated with the locking member for pressing the locking element against a tapering counter surface fixed in position relative to the shaft to prevent axial movement of the ring member on the shaft.

BRIEF DESCRIPTION OF THE DRAWING FIGURES

The above and other details associated with the present invention will become more readily apparent and understood from the following detailed description considered with reference to the drawing figures in which like elements are designated by like reference numerals and wherein:

FIG. 1 is a side view, partly in cross-section, of a portion of a shaft to which is affixed a ring member by way of the method and device according to the present invention;

FIG. 2 is a side view similar to FIG. 1 showing a slightly modified embodiment of the present invention;

FIG. 3 is a side view similar to FIG. 1, but illustrating the ring member in a position where it is not arrested to the shaft;

FIG. 4 is a perspective view of a locking element which forms a part of the device according to the present invention as shown in FIGS. 1–3;

FIG. 5 is a side view similar to FIG. 1 illustrating a modified embodiment of the device according to the present invention used together with a hydraulic nut;

FIG. 6 is an enlarged side view of a portion of the device depicted in FIG. 5.

DETAILED DESCRIPTION OF THE PREFERRED EMBODIMENTS

Figure 7:
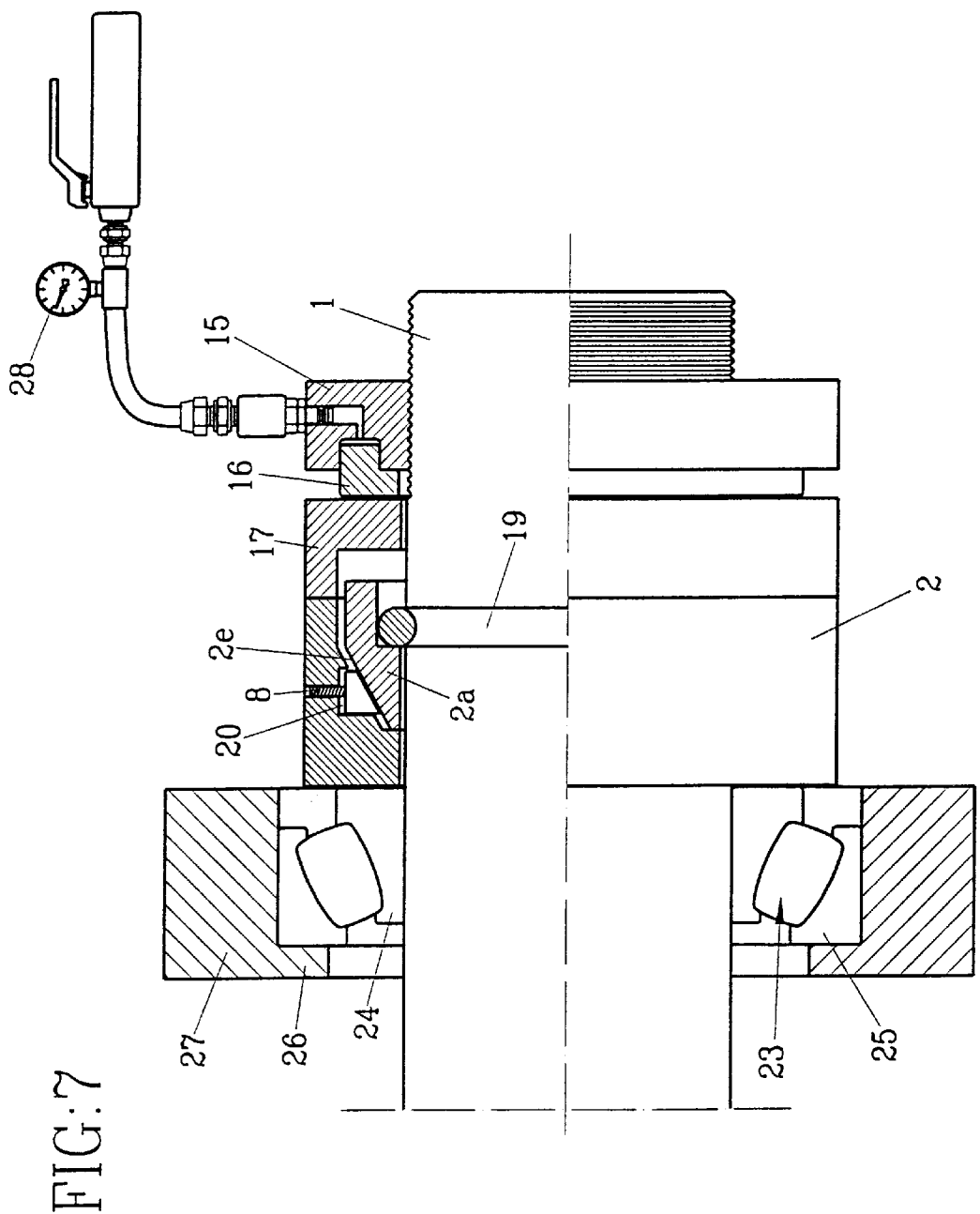
FIG. 7 shows the ring member illustrated in FIG. 5 used for securing an inner race ring of a preloaded taper roller bearing in position.

FIG. 1 shows a first embodiment of the device according to the invention used for carrying out or effecting the method according to the invention. As illustrated, a shaft 1 is provided and a ring member 2 (e.g., a bearing inner race ring) is fitted to the shaft so that the shaft projects through the ring bore which extends axially through the ring member.

As seen in FIG. 1, the envelope or outer peripheral surface of the shaft 1 is equipped with a recess 3. The recess is formed as a notch that tapers in the longitudinal direction of the shaft. The deeper portion of the notch is located at the left hand side as seen in FIG. 1 and the notch possesses a smooth transitory portion extending up to the envelope surface of the shaft at the opposite end. The recess 3 extends around only a limited circumferential extent of the outer peripheral surface of the shaft 1.

The ring member 2 is provided with a recess 4 disposed in the inner bore surface of the ring member 2. The recess 4 opens towards the interior of the ring member. This ring member recess 4 has a circumferential extent and a longitudinal length substantially corresponding to the circumferential extent and longitudinal length of the recess 3 in the shaft 1. In a direction radially outwards, the ring member recess 4 is closed off by a wall member 5. The wall member 5 in the embodiment shown has a radial opening 6, the purpose of which will be explained hereinafter. Furthermore the wall member 5 has a substantially radially extending, threaded through-bore 7 which houses a screw 8. The screw 8 is adapted to be screwed inwardly towards and outwardly away from the outer envelope surface of the ring member 2.

Fitted in the recess 4 is a locking element 10 having a first body portion 11 with a width substantially corresponding to the width of the recesses 3, 4 in the shaft 1 and the ring member 2. The length of the locking element 10 is somewhat shorter than the length of the recesses 3, 4. This body portion 11 is substantially rectangular, but has at its lower side 12 a tapering shape, being complementary to the shape of the recess 3 in the shaft 1.

From the upper side of the locking element body portion 11 and extending upwards, i.e. in a direction away from the tapering surface 12, is a short beam-like element 13 that is received and guided in the radial opening 6 in the wall member 5 of the ring member. As can be seen, the recess 4 in the ring member 2 has substantially the same radial depth as the height of the mainly rectangular body portion 11 of the locking element 10. By screwing in the screw 8 through the bore 7 in the wall portion 5 against the locking element 10, the tip of the screw 8 will press against the surface of the locking member 10 opposed to its tapering surface 12, thereby urging the tapering surface down into the recess 3 in the shaft to cause the locking member 10 as well as the ring member 2 to be arrested or fixed axially as well as radially in their respective positions relative to the shaft 1. This arresting affect is obtained instantaneously, when the screw 8 is screwed down into the locking position.

FIG. 2 illustrates a slightly modified embodiment of the present invention as compared to that of FIG. 1. In the FIG. 2 embodiment, all elements and members of the embodiment of FIG. 1 are similar, except that the recess in the shaft is made as a circumferential groove 3a extending entirely around the shaft in the circumferential direction. The groove 3 also has a tapering shape. In this embodiment, the instantaneous locking of the ring member 2 to the shaft 1 only brings about a secure axial locking, whereas it is possible for the ring member to slide in the circumferential direction relative to the shaft.

FIG. 3 is a view similar to FIG. 2, but illustrating the locking screw 8 after it has been unscrewed. In the unscrewed state, the tip of the screw no longer presses down the cooperating surface of the locking element 10 and so the tapering surface 12 of the locking element 10 does not project into the recessed groove 3a in the shaft and is not able to reliably prevent relative axial movement between the ring member 2 and the shaft 1. In the state shown in FIG. 3, the beam-like element 13 is tilted in the radial opening 6, and the locking element 10 is moved radially out of the recess 3a, manually via the beam-like element 13 or by contact with anyone of the edges of the groove 3a.

FIG. 4 shows in perspective a locking element 10 of the type forming a part of the device depicted in FIGS. 1–3. As earlier described, the locking element 10 according to this embodiment includes a substantially parallelepipedic body portion 11, having a lower side wall 12 that tapers from a thick section at one side of the body portion and continues into a low continuously smaller projecting member 12a at the opposite side of the body portion 11. At its end opposite from the tapering side wall 12, the body portion 11 is provided with the short beam-like element 13 projecting in a direction away from the tapering side wall 12. The bottom surface of the free end of the projecting member 12a has a somewhat curved surface, intended to correspond to the curvature of the shaft 1 or the recess in the shaft.

FIG. 5 depicts a modified embodiment of the device according to the present invention, which embodiment is particularly well suited for preloading a ring member on a shaft and thereupon instantaneously arresting or fixing it to the shaft in an exactly preloaded position. As illustrated, a ring member 2 is fitted on a shaft 1. One end of the shaft 1 has an attachment means, here in the form of a threaded portion 14, upon which is fixed (in a screwed-on fashion in this embodiment) a hydraulic nut 15 or the like, of any appropriate conventional type. The hydraulic nut, with its annular piston 16, transfers an axial preloading force to the ring member 2, either directly or via an intermediate ring 17 such as shown in FIG. 5.

In this embodiment, the ring member 2 is split into two halves 2a, 2b along a substantially axially extending, tapering parting surface 2c (see FIG. 6). The inner half 2a of the ring member 2 has a substantially cylindrical inner bore, whereas the outer half 2b can have a variety of different external shapes, although it is shown in FIGS. 5 and 6 with a cylindrical outer shape. The two ring halves 2a, 2b have complementary tapering surfaces facing each other. The tapering surface of the outer ring half 2b is bordered by cylindrical portions having different diameters. The cylindrical portion having the smaller diameter is guided by the shaft 1, whereas the opposite axial portion with the larger diameter is arranged to surround a cylindrical, axially extending projection 2d of the inner ring member half 2a. This cylindrical projection 2d has an inner diameter that is greater than the inner diameter of the main portion of the inner ring member half 2a located at the opposite axial portion of the inner ring member half 2a. Thus, an annular space is formed between this projection 2d and the shaft 1 in the mounted position. This annular space is provided to house a radially projecting stop ring 18, e.g. a wire circlip, that is arranged in a circumferential groove 19 in the shaft. The stop ring 18 functions to prevent the inner ring member half 2a from moving axially in one direction relative to the shaft (i.e., in the direction to the right in FIG. 5).

The outer ring member half 2b is provided with at least one chamber 20 that opens towards the tapering surface 2e of the ring member half 2b. This chamber 20 houses and guides a locking element 21. The locking element 21 is movable between a position completely enclosed in the chamber 20 and positions wherein it projects out from the chamber 20 to engage and be lockingly pressed against the tapering surface 2e of the inner ring member half 2a.

For facilitating a reliable and safe locking of the locking element 21 to the inner ring member half 2a, and thereby the entire ring member 2 to the shaft 1, the side face 22 of the locking element 21 that projects out from the chamber 20 has a taper corresponding to that of the tapering surface 2e of the inner ring member half 2a. To ensure that the locking element 21 will not be incorrectly positioned in the chamber 20, the chamber 20 and/or the locking element 21 is preferably designed so that the locking element 21 can be positioned with its tapering surface in the illustrated position show in FIGS. 5 and 6. At least one tightening means, which in the embodiment shown is in the form of a locking screw 8, is provided to permit easy application of a wedge force between the locking element 21 and the inner ring member half 2a.

With the embodiment according to FIG. 5 and 6, it is possible in a very reliable manner to give the ring member 2 a desired preload by way of the hydraulic nut 15. The nut 15 acts upon the outer ring member half 2b via the intermediate ring 17 and arrests or fixes the ring member 2 to the shaft 1 instantaneously by applying a sufficient wedge force via the tightening means 8 acting upon the locking element 21 without first relieving the axial force exerted by the hydraulic nut or the like.

FIG. 7 illustrates how the arrangement with a split ring member 2 and a hydraulic nut 15 according to the embodiment of FIGS. 5 and 6 is used for applying a preload on a taper roller bearing 23. The intermediate ring 17 transfers the force of the hydraulic nut 15 to the ring member 2, which in turn presses against the inner race ring 24 of the bearing 23, with the outer race ring 25 abutting a fixed stop surface 26 in a housing 27, whereby the axial force via the intermediary of the taper rollers builds up a preload in the bearing. When this preload is of a desired size, as can be determined with aid of the reading on a pressure gauge 28 which is connected to the hydraulic nut 15 via a conduit, the tightening means 8 of the ring member is operated to cause the locking element 21 to apply a locking wedge force between the components of the ring member 2. This instantly locks also the bearing inner race ring at a position in which the bearing 23 has a desired internal preload. When this locking has been obtained the axial force from the hydraulic nut 15 can be relieved and the hydraulic nut can be removed from the shaft 1.

It is to be understood that the invention is not limited to the embodiments shown and described, but encompasses modifications and variants within the scope of the invention. Thus, for instance, although the tightening means has been shown and described as screws, these tightening means might for instance be tool-adjustable eccentrics, or other tightening means.

Furthermore the ring member may be formed integral with a bearing inner race ring or it can be provided just as a stop member designed to prevent axial movement of a separate bearing race ring or the like in one axial direction. By choosing the taper angle of the tapering locking surfaces in an appropriate manner, it is possible to obtain a self-braking joint which prevents movement also in the opposite axial direction.

Although the drawing figures show only one locking element, it is to be understood that in most embodiments, it is convenient to have more than one locking element, e.g. three locking elements, uniformly distributed over the circumference of the ring member.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A device for fitting a ring member, comprised of an inner ring member half having a tapered surface and an outer ring member half, to a shaft with the shaft extending through a bore of the ring member, comprising at least one locking element mounted on the ring member and provided with a tapering contact surface that faces towards the tapering surface of the inner ring member half, and means operatively associated with the locking element for pressing the tapering contact surface of the locking element against the tapering surface of the inner ring member half to prevent axial movement of the ring member on the shaft.

2. A device as recited in claim 1, wherein the inner ring member half is axially arrested against the shaft.

3. A device as recited in claim 1, including a locking ring positioned in a circumferential groove in the shaft and abutting a radial wall of the ring member.

4. A device as recited in claim 3, wherein the radial wall is formed on the inner ring member half.

5. A device as recited in claim 1, wherein the outer ring member half is provided with a chamber in which is movably positioned the means for pressing.

6. A device as recited in claim 1, wherein the tapering surface of the inner ring member half is tapered the same as the tapering contact surface of the locking element.

7. A device which fits a ring member on a shaft with the shaft extending through a bore in the ring member, the ring member including an inner ring member and an outer ring member, with the inner ring member having a tapering contact surface, the device comprising a locking element movably positioned within a seat in the outer ring member, the locking element being provided with a tapering contact surface that faces towards the tapering surface of the inner ring member, and means operatively associated with the locking element for pressing the tapering contact surface of the locking element against the tapering surface of the inner ring member half to prevent axial movement of the ring member on the shaft.

8. A device as recited in claim 7, wherein the inner ring member half is axially arrested against the shaft.

9. A device as recited in claim 7, including a locking ring positioned in a circumferential groove in the shaft and abutting a radial wall of the ring member.

10. A device as recited in claim 9, wherein the radial wall is formed on the inner ring member.

11. A device as recited in claim 7, wherein the outer ring member is provided with a chamber in which is movably positioned the means for pressing.

12. A device as recited in claim 7, wherein the tapering surface of the inner ring member is tapered the same as the tapering contact surface of the locking element.

13. A device as recited in claim 7, including a nut threadably engaging a threaded outer surface portion of the shaft to apply an axial preload to the ring member.

14. A device as recited in claim 7, wherein the outer ring member has a tapering surface that faces the tapering surface of the inner ring member.

* * * * *